United States Patent
Mathes et al.

(10) Patent No.: US 7,908,284 B1
(45) Date of Patent: Mar. 15, 2011

(54) CONTENT REFERENCE PAGE

(75) Inventors: Adam B. Mathes, Mountain View, CA (US); Xuefu Wang, Los Altos, CA (US); Jeffrey Bartelma, San Francisco, CA (US); Gopal Venu Vemula, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/860,527

(22) Filed: Aug. 20, 2010

Related U.S. Application Data

(63) Continuation of application No. 11/543,721, filed on Oct. 4, 2006.

(51) Int. Cl.
*G06F 17/30* (2006.01)

(52) U.S. Cl. .................................... 707/755; 715/205

(58) Field of Classification Search .............. 707/755; 715/205
See application file for complete search history.

(56) References Cited

U.S. PATENT DOCUMENTS

| | | | |
|---|---|---|---|
| 4,484,826 A | 11/1984 | Horn et al. | |
| 5,434,964 A | 7/1995 | Moss et al. | |
| 5,463,725 A | 10/1995 | Henckel et al. | |
| 5,729,673 A | 3/1998 | Cooper et al. | |
| 5,748,931 A | 5/1998 | Jones et al. | |
| 5,751,283 A | 5/1998 | Smith et al. | |
| 5,761,686 A | 6/1998 | Bloomberg | |
| 5,778,381 A | 7/1998 | Sandifer | |
| 5,794,257 A | 8/1998 | Liu et al. | |
| 5,848,184 A | 12/1998 | Taylor et al. | |
| 5,957,697 A | 9/1999 | Iggulden et al. | |
| 6,091,930 A | 7/2000 | Mortimer et al. | |
| 6,240,410 B1 | 5/2001 | Wical | |
| 6,289,512 B1 | 9/2001 | Edwards et al. | |
| 6,356,923 B1 | 3/2002 | Yano et al. | |
| 6,366,933 B1 | 4/2002 | Ball et al. | |
| 6,486,895 B1 | 11/2002 | Robertson et al. | |
| 6,539,387 B1 | 3/2003 | Oren et al. | |
| 6,728,403 B1 | 4/2004 | Jang et al. | |
| 6,820,111 B1 | 11/2004 | Rubin et al. | |
| 6,907,431 B2 | 6/2005 | Lin | |
| 6,992,687 B1 | 1/2006 | Baird et al. | |
| 7,020,663 B2 | 3/2006 | Hay et al. | |
| 7,047,490 B1 | 5/2006 | Markovic et al. | |
| 7,071,915 B2 | 7/2006 | Liang et al. | |
| 7,259,753 B2 | 8/2007 | Keely et al. | |
| 7,401,286 B1 | 7/2008 | Hendricks et al. | |
| 7,404,147 B2 | 7/2008 | Bell et al. | |
| 7,447,771 B1 | 11/2008 | Taylor | |
| 7,673,019 B2 * | 3/2010 | Chi et al. ...................... 709/219 |

(Continued)

OTHER PUBLICATIONS

Amazon.com Webpage, published Feb. 21, 2002, accessed Apr. 23, 2008, 9 pages.

(Continued)

*Primary Examiner* — James Trujillo
*Assistant Examiner* — William Spieler
(74) *Attorney, Agent, or Firm* — Fish & Richardson P.C.

(57) ABSTRACT

A user interface (e.g., a browser window) includes a display area for displaying a content reference page. In some implementations, a content reference page is generated that includes information related to content. The content reference page includes sections for presenting keywords found in the content, reviews of the content, portions of content that are of interest to a user (or a class of users) and other useful references, etc.

15 Claims, 7 Drawing Sheets

U.S. PATENT DOCUMENTS

| | | |
|---|---|---|
| 2001/0007980 A1 | 7/2001 | Ishibashi et al. |
| 2002/0059334 A1 | 5/2002 | Jelbert |
| 2002/0075504 A1 | 6/2002 | Fernandez et al. |
| 2002/0083096 A1 | 6/2002 | Hsu et al. |
| 2002/0118230 A1 | 8/2002 | Card et al. |
| 2003/0042319 A1 | 3/2003 | Moore |
| 2004/0006742 A1 | 1/2004 | Slocombe |
| 2004/0162853 A1 | 8/2004 | Brodersen et al. |
| 2004/0177323 A1 | 9/2004 | Kaasila et al. |
| 2004/0225658 A1 | 11/2004 | Horber |
| 2005/0010865 A1 | 1/2005 | Kuppusamy et al. |
| 2005/0034068 A1 | 2/2005 | Jaeger |
| 2005/0039138 A1 | 2/2005 | Urbina |
| 2005/0071743 A1 | 3/2005 | Harrington et al. |
| 2005/0094207 A1 | 5/2005 | Lo et al. |
| 2005/0183030 A1 | 8/2005 | Bertram et al. |
| 2005/0193330 A1 | 9/2005 | Peters |
| 2005/0216449 A1 | 9/2005 | Stevenson |
| 2005/0229110 A1 | 10/2005 | Gegner et al. |
| 2005/0237321 A1 | 10/2005 | Young et al. |
| 2005/0246643 A1 | 11/2005 | Gusmorino |
| 2006/0015821 A1 | 1/2006 | Parker et al. |
| 2006/0026536 A1 | 2/2006 | Hotelling et al. |
| 2006/0047682 A1 | 3/2006 | Black et al. |
| 2006/0155703 A1 | 7/2006 | Dejean et al. |
| 2006/0179405 A1 | 8/2006 | Chao et al. |
| 2006/0214953 A1 | 9/2006 | Crew et al. |
| 2007/0116359 A1 | 5/2007 | Ohk |
| 2007/0117079 A1 | 5/2007 | Budlow et al. |
| 2007/0196015 A1 | 8/2007 | Meunier et al. |
| 2008/0082911 A1 | 4/2008 | Sorotokin et al. |

OTHER PUBLICATIONS

Dejean, et al., "Structuring Documents According to Their Table of Contents," *DocEng '05*, Nov. 2-4, 2005, ACM 1-59593-240-2/05/0011, pp. 2-9.

Fan et al., S. 2005, "A Comprehensive Image Processing Suite for Book Re-mastering," In Proceedings of the Eighth International Conference on Document Analysis and Recognition (Aug. 31-Sep. 1, 2005). ICDAR, IEEE Computer Society, Washington, DC, 447-451, DOI=http://dx.doi.org/10.1109/ICDAR.2005.5, 6 pages.

Google, About Google Print (Beta), Oct. 12, 2004, (accessed Dec. 10, 2009 at http://web.archive.org/web/20041012082109/http://print.google.com/), 3 pages.

Google, About Google Print (Beta)—Book Image Example, Oct. 12, 2004 (accessed Dec. 10, 2009 at http://web.archive.org/web/20041012062608/print.google.com/googleprint/about_example.html ), 1 page.

Google, About Google Print (Beta) (HTML sourcecode), Oct. 12, 2004, (accessed Dec. 10, 2009 at http://web.archive.org/web/200041012082109/http://print.google.com/), 6 pages.

He, et al., "Hierarchical logical structure extraction of book documents by analyzing tables of contents," Document Recognition and Retrieval XI, Proc. of SPIE-IS&T Electronic Imaging, SPIE vol. 5296, © 2004, SPIE and IS&T, Jan. 2004, 9 pages (pp. 6-13, plus 1).

Sullivan, Andrew, "None of the Above," Oct. 24, 1999, New York Times (retrieved Oct. 17, 2008), 2 pages.

The New York Times: "Books," Jul. 12, 2001 (as retrieved from the Wayback Machine, Oct. 17, 2008), 3 pages.

Mandal, S., et al., "Automated Detection and Segmentation of Table of Contents Page from Document Images", Proceedings of the Seventh International Conference on Document Analysis and Recognition, 2003, 5 pages.

X. Lin and Y. Xiong, "Detection and analysis of table of contents based on content association," International Journal of Document Analysis (2006), 8(2), Jul. 13, 2005, © Springer-Veriag, 2005, pp. 132-143.

Xiaofan Lin and Steven Simske, "Automatic Document Navigation for Digital Content Re-mastering," Sep. 23, 2003 SPIE Conference on Document Recognition and retrieval XI, Jan. 18-22, 2004, 9 pages (cover page and pp. 1-8).

Yacoub et al., "Document Digitization Lifecycle for Complex Magazine Collection," *DocEng '05*, Nov. 2-4, 2005, pp. 197-206.

Yacoub, Sherif, "Identification of Document Structure and Table of Content in Magazine Archives," 2005, *Proceedings of the Eighth International Conference on Document Analysis and Recognition*, 2005, 7 pages.

\* cited by examiner

FIG. 6

○○○ Sound of the Beast: The Complete Headbanging History of Heavy Metal

| Daytrips Hawaii, 2nd E... | The Adventures of Hu... | Sound of the Beast: The Complete Headbanging History of Heavy Metal - Google Boo... | Caribou - test index f... | GoSound of the Beast: Th... |

HEAVY METAL

Sound of the Beast: The Complete Headbanging History of Heavy Metal
Ian Christie
Published by Harper Collins Books (2004)
music / popular culture
416 pages - English
Paperback - 5.51 x 8.46 x 0.77 in
ISBN 893482934

Find libraries
Buy this book
HarperCollins
Amazon.com
Barnes&Noble.com
Strand Books

[ Preview this book ]  — 701

Contents — 702

A Brief Headbanging History of Time
  metal, evil, black sabbath
Prelude to Heaviness
  funeral, heavy, mayhem
The New Wave of British Heavy Metal
  britain, guitar, awesome
The American Wasteland Awaits
  america, youth, disco
Highways & Video Waves
  college radio, touring
Metallica & Power Metal
  lame, cheesy, commercial
The PMRC's Antimetal Panic
  parents, drugs, satan
The Mental Metal Reaction
  death, apocalypse
Thrash Metal Attacks!
  destroy, burn
Slayer: Kings of Black Metal Devils
  slayer, doom show all 21 sections >>

Pages with images — 706

Reviews — 704

1  Two thumbs way up!  ★★★★★ 5/5
   On par with such classic works as Fitzgerald's The Great Gatsby or Steinbeck's The Grapes of Wrath, Christie's work is one of those rare masterpieces...
   New York Times - Editorial review - May 4, 2006

7  Breathtaking  ★★★★☆ 4.4/5
   While music journalism is often derided as the bastard child of the literary world, Christie has seemingly succeeded in bringing heavy metal to the pedantic set...
   Wisconsin Rapid Daily Tribune - Editorial review - May 4, 2006

27 Metal House on the Prairie  No rating available
   Christie's work is one of those rare masterpieces that seems to capture the essence of an American era, of a small slice of our collective American experience...
   Des Moines Register - Editorial review - May 4, 2006

47 Scholastic Hand of Doom  ★★★★★ 4/5
   This book is a truly scholastic and academic examination reminiscing on heavy metal music, not only concerned with the music, but as the genre as a legitimate artistic expression of a neglected social underclass...
   Onion AV Club - Editorial review - April 21, 2004

66 Max out your "Metal Detector"!  ★★★★☆ 4.5/5
   Prepare to have your face blown off by this book! The narrative is so awesome I have to start headbanging as I read! If this doesn't set off your heavy metal detector nothing will!
   amazon.com - User review - May 4, 2006

84 show all 37 reviews >>

102

117                                    — 708

126

143

Key words

Words and phrases
  heavy metal, head banging, power metal, hard rock, black metal, nu metal, thrash metal, metal icons, half band People, places and things
  Black Sabbath, Ozzy Osbourne, Led Zeppelin, Metallica, Lars Ulrich, Judas Priest, Twisted Sister, Iron Maiden, AC/DC

FIG. 7

CONTENT REFERENCE PAGE

CROSS-REFERENCE

This application is a continuation application of U.S. patent application Ser. No. 11/543,721, filed Oct. 4, 2006, the entire disclosure of which is hereby incorporated by reference.

TECHNICAL FIELD

The subject matter of this application is generally related to aggregating information about content for presentation on a display area.

BACKGROUND

Information technology has provided new ways of publishing books, newspapers, magazines and periodicals. Electronic books ("e-books") can be purchased and downloaded from e-bookstores online and read on various devices, such as personal computers, personal digital assistants (PDAs), pocket-PCs, mobile phones, media player/recorders, dedicated e-book readers, etc. An e-book is typically a collection of digital objects or documents, which are packaged and formatted with the intention of being displayed on a device or read by a speech generating application. E-books can be distributed over a network as a sequence of images, for example, one image for each page. E-books that are distributed over a network (e.g., the Internet, wireless network) using Hypertext Mark-up Language (HTML) can be read using a standard browser (e.g., Microsoft® Internet Explorer).

Conventional e-book technology suffers several drawbacks. For example, exploring an e-book typically requires horizontal motion (flipping through pages) and vertical motion (scrolling within every page), which makes regular sequential reading of book pages frustrating. Another drawback is the poor use of free space on large display screens and limited space on small display screens.

In addition to the deficiencies described above, conventional e-book distributors and other online content resources do not provide a comprehensive online source of aggregated reference materials related to content.

SUMMARY

A user interface (e.g., a browser window) includes a display area for displaying a content reference page. In some implementations, a content reference page is generated that includes information related to content. The content reference page includes sections for presenting keywords found in the content, reviews of the content, portions of content that are of interest to a user (or a class of users) and other useful references, etc.

In some implementations, a method includes: aggregating reference materials associated with content; generating a content reference page including at least some of the aggregated reference materials, where the content reference page includes reference materials from the content and/or one or more other resources; receiving a request for reference material associated with the content; and providing the content reference page in response to the request.

Other implementations are disclosed, including implementations directed to systems, methods, apparatuses, computer-readable mediums and user interfaces.

DESCRIPTION OF DRAWINGS

FIG. 6 is a screen shot illustrating an exemplary table of contents including links.

FIG. 7 is a screen shot illustrating an exemplary book reference page.

DETAILED DESCRIPTION

Viewport Overview

Figure 1:
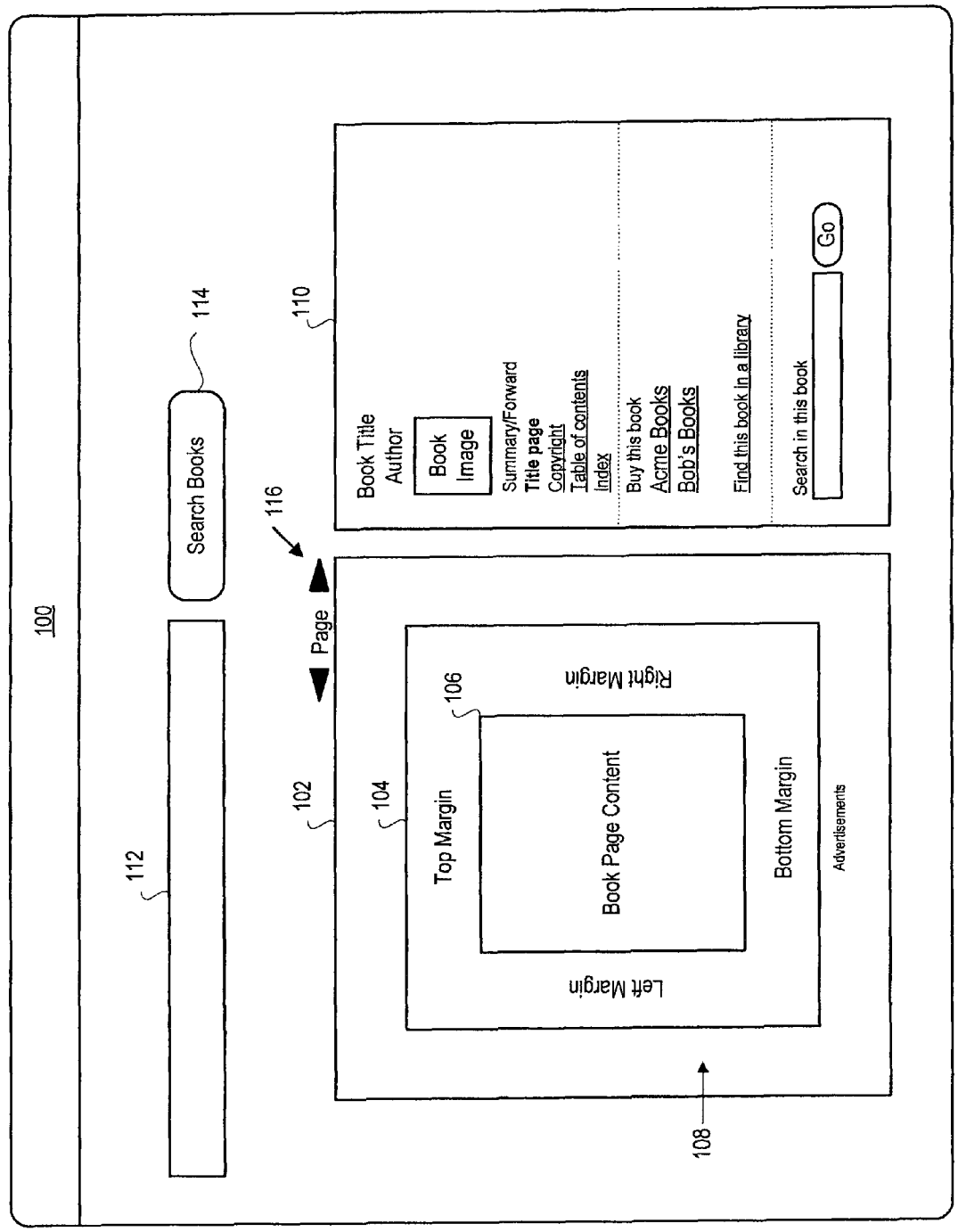
FIG. 1 illustrates an exemplary viewport for displaying images.

FIG. 1 illustrates an exemplary viewport 102 for displaying an image 104. In some implementations, the viewport 102 is displayed in a user interface 100 (e.g., a browser window). In the example shown, the viewport 102 is used to view book page images in an e-book application. The viewport 102, however, can be used to view other types of content (e.g., news articles, magazines, newspapers, .pdfs, blogs).

The viewport 102 can be provided by a server (e.g., a web server) over a network (e.g., the Internet, wireless network). In the example shown, the viewport 102 can be presented on a web page interface for a book search engine. A user can enter a search term (e.g., the title of a book) in a search box 112, and click a button 114 to begin or otherwise activate the search process. An example of a book search engine is Google™ Book Search, developed by Google Inc. (Mountain View, Calif.).

The search results can be presented to the user with other information (e.g., a summary, image) and a link to allow the user to view one or more pages of the book. For example, when the user clicks the link corresponding to a book the user wants to review, a book page image 104 can be presented in a display area 108 of the viewport 102. The book page image 104 typically includes book page content 106 (e.g., text, images), which can be set-off by margins. In some implementations, the book page image is a digital image of an actual book page. In some implementations, a single page layout or a two page layout (pages displayed side by side) can be displayed in the display area 108 of the viewport 102.

Figure 6:
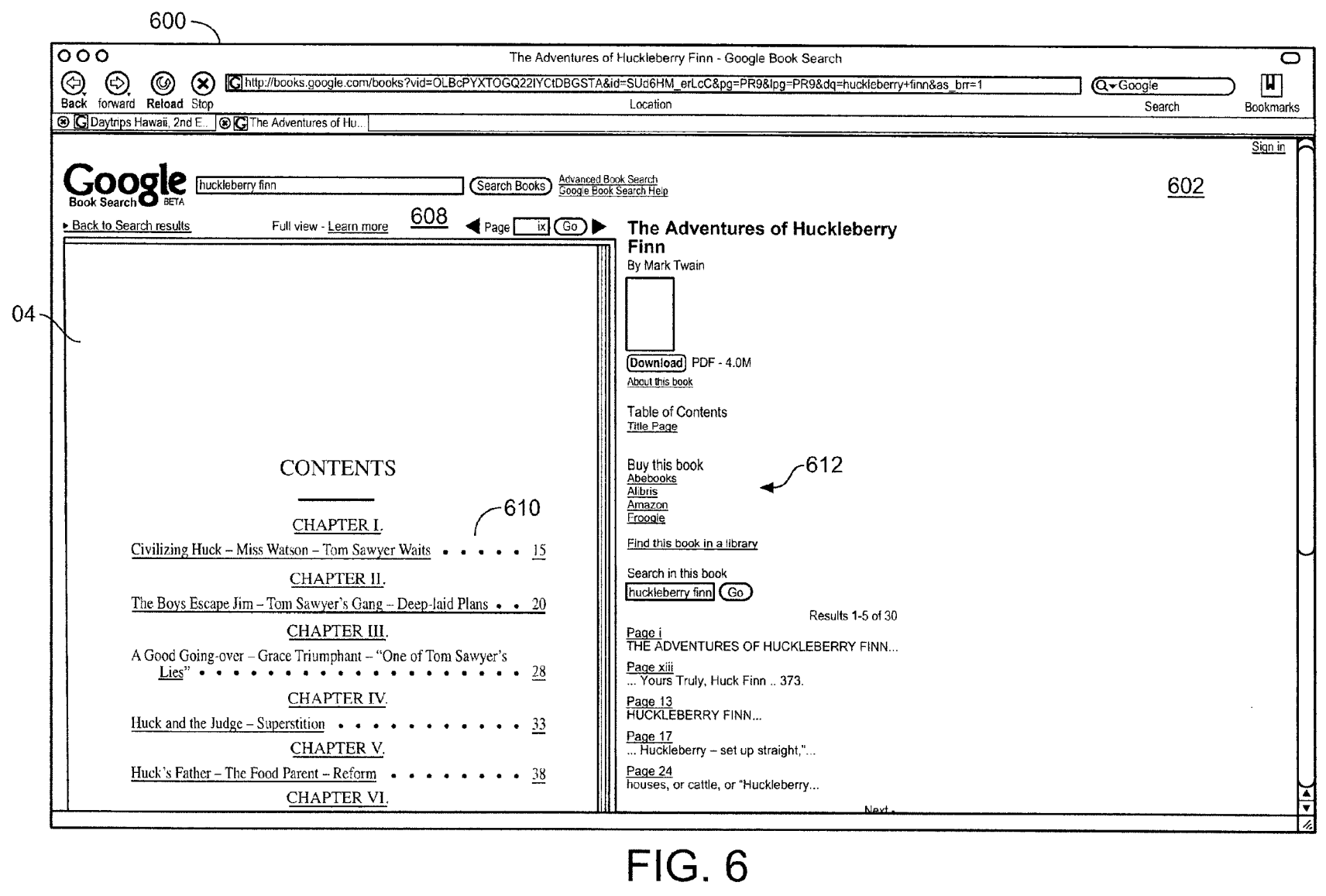

In addition to the viewport 102, a panel 110 can be displayed (e.g., side panel as shown) for presenting information related to the book. Such information can include, but is not limited to: title, author, summary or forward, title page link, copyright link, table of contents (TOC) link, index link, links to book retailers, library search link, a book search engine for searching for particular terms inside the book, etc. For example, if the user clicks the TOC link, then an image of the book's TOC will be displayed in the viewport 102, as shown in FIG. 6.

The user can navigate (e.g., flip) through book pages using the controls 116 (e.g., arrow buttons). By clicking the controls 116, the book page images can be displayed in two directions. The controls 116 can change according to the image that is displayed in the viewport 102. In some implementations where an entire book is viewable, the user can enter a page number into a search box and go directly to that page without incrementing through other pages. An example of a search box is the search box 608 shown in FIG. 6. In other implementations where only a few consecutive pages can be navigated (e.g., first few pages of a chapter), the controls 116 can be provided. Other controls for navigating a book can be included, such as scroll bars, buttons, links, speech command recognition, multi-touch displays, etc.

In some implementations, the viewport 102 (and the book page image contained therein) rescales with the user interface 100. For example, the user interface 100 may be manually resized for display using an input device (e.g., a mouse), or the viewport 102 may be automatically resized for display by an application or operating system of a device that may have a limited screen space (e.g., a portable computer, mobile phone, media player/recorder, PDA). To create a more comfortable user experience for extended reading, it is desirable to manage the screen space for displaying the book pages. This can be accomplished by filling the viewport 102 with a book page image 104 that has been rescaled to a size determined by the available display area 108 in the viewport 102 (i.e., the viewport dimensions) and other factors, which are described in reference to FIG. 2.

Scaling Process

Figure 2:
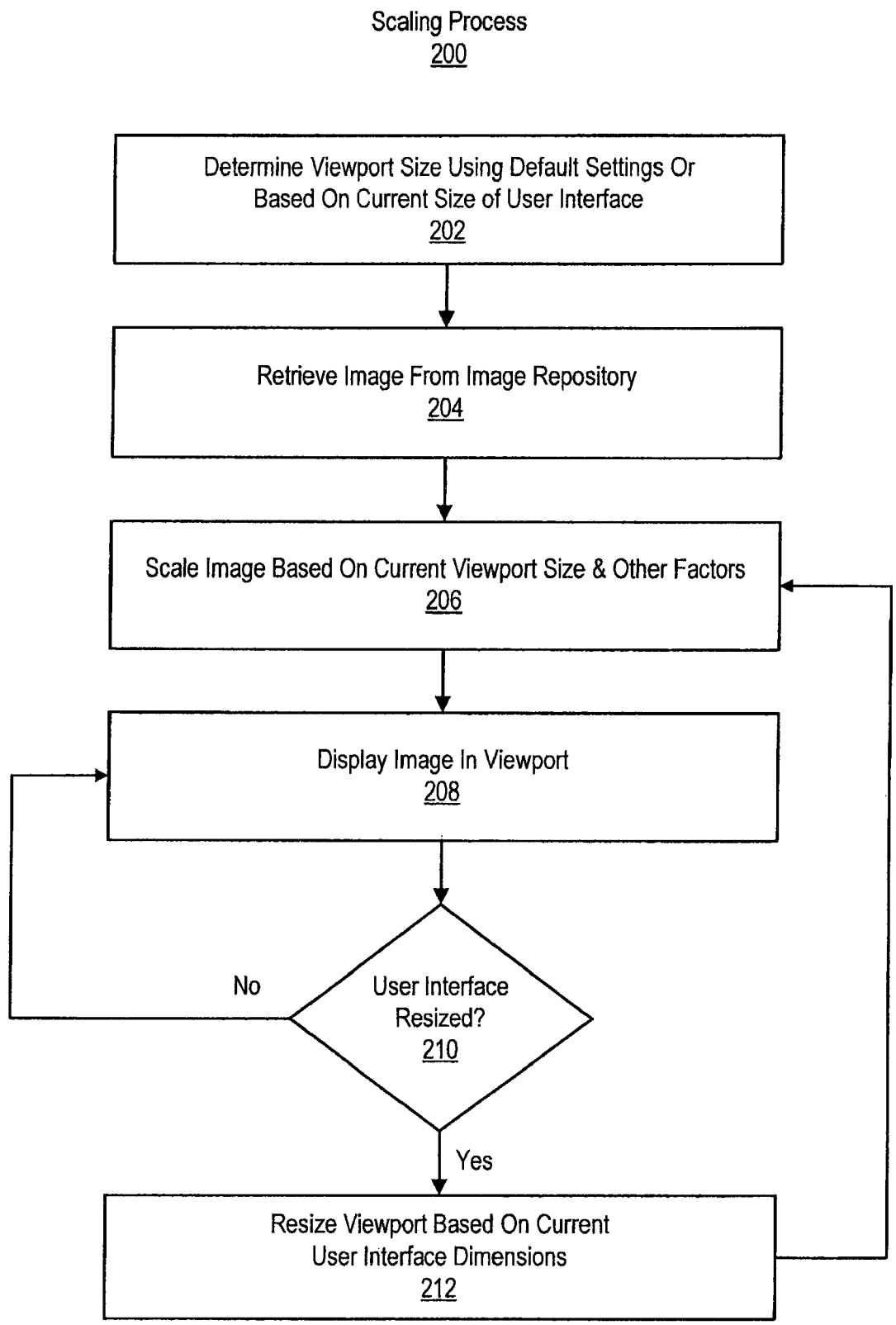
FIG. 2 is a flow diagram for an exemplary scaling process for the viewport of FIG. 1.

FIG. 2 is a flow diagram for an exemplary scaling process 200. In some implementations, the process 200 begins when a viewport is launched in a user interface (e.g., a browser window) in response to a trigger event. The dimensions of the viewport can be determined from default values or based on the current size of the user interface (202). For example, if a user clicks a link corresponding to a result of a book search, the viewport can be launched based on default settings, and a default image can be displayed in the viewport (e.g., a title page or first page of a book). In some implementations, books are previously scanned and processed to extract and/or determine information (e.g., dimensions) that can be used to later manage the display of images in a viewport. Such processing can include, but is not limited to: determining a typical text bounding box for the book page images, determining a text bounding box for each book page image, removing artifacts in book page images (e.g., artifacts due to systematic scanning error), etc.

If the user clicks a control to select a different book page, the selected book page image can be retrieved from an image repository (204) or other suitable data structure for storing images (e.g., cache memory). In some implementations, the image is scaled to fit in the viewport given the current dimensions of the viewport and other factors (206). In other implementations, the user is provided with zoom controls with predetermined zoom "stops". The zoom stops can be set as a function of viewport size (e.g., height, width). The zoom stops fit the image to the height and/or width of the viewport. The zoom stops can have absolute bounds to prevent the image from being made arbitrarily large or small.

The scaled image is displayed in the viewport (208). If the user interface (e.g., browser window) is resized (210), then the viewport can be re-sized based on the current dimensions of the user interface (212) and the process 200 returns to step 206. Alternatively, the viewport can be maintained based on user settings or preferences. For example, a user may want the size of the viewport to remain fixed when the user interface is resized.

In some implementations, the dimensions of the viewport 102 are provided by a window manager service, which is commonly included as part of an operating system (e.g., Windows XP). Other factors that can be used to scale an image for display in the viewport can include, but are not limited to:

- the x-height (approximately the line height in pixels) of text on the book page, which can be provided by an optical character recognition (OCR) system, such as the Tesseract OCR engine developed by Hewlett-Packard, Inc.;
- a bounding box for text on the book page image, as given by margin recognition or the user's current browser text size; and
- the user's current browser text size. For example, text can be rendered to a hidden portion of the user interface (e.g., a browser window) and measured to estimate the user's browser text size, and a scale factor can be determined from the measurement for correcting the image size.

In some implementations, scaling can be determined empirically using some principles (e.g., rules, guidelines, options, etc.). Some exemplary principles for determining a scaled size include, but are not limited to:

- Rule 1: At the scaled size there should not be horizontal scrolling within the viewport.
- Rule 2: At the scaled size, the height "x" should not be below a threshold value of N (e.g., 10 or 12 pixels).
- Guideline 1: If the text on the book page image is "close" to fitting in the viewport (vertically), the scaled size image should fit entirely in the viewport. In some implementations, the scaling can be performed by a user with "zoom" controls having zoom "stops" that are customized to the particular image being zoomed.
- Guideline 2: In general, minimize the number of times the viewport is filled to consume a book page image. This minimization can be achieved in part through margin cropping, as described in reference to FIG. 3.

In some implementations, a bounding box of the text on the page can be padded. If the padded bounding box is "close" to fitting in the display area 108 of the viewport 102, then the image is scaled to fit the display area 108. In some implementations, the scaling is performed provided the text does not drop below a minimum x-height. In some implementations, the bounding box is "close" to fitting in the viewport if a certain portion (e.g., a percentage) of the bounding box fits within the viewport. Otherwise, more than one "viewportful" of vertical space may be needed to display the page.

Although any given book page image can have a fixed aspect ratio, the viewport 102 containing the book page image does not have to have a fixed aspect ratio. The image could be long and narrow if the whole page is being displayed or short and wide if the top half of the page is displayed. Thus, there can be at least two options:

- Option 1: Minimize the number of "viewportfuls" needed to show a single book page image, at the expense of text size (e.g., place as much text into the viewport as possible by scaling down the text until the text reaches nearly the minimum line height).
- Option 2: Scale the image up to get larger text, at the cost of needing more "viewportfuls" to consume a single book page. The upper bound on the up scaling can be set by Rule 1—no horizontal scrolling. This approach can be better suited for a shorter, wider viewport.

In some implementations, the page image can be scaled to a size so that a predetermined percentage of the page image fits in the viewport 102 (e.g., the top 55% of the page). When the user clicks the controls 116, the remaining portion of the page image can be displayed in the viewport 102 (e.g., the bottom 55% of the page), rather than a new page. Alternatively, a separate control (e.g., a toggle button) can be provided for handling the scenario described above.

Using a Scaled Image

In some implementations, a scaled image is displayed by default. A zoom feature can be included that allows the user to zoom between a scaled image and the image with its original dimensions. Alternatively, software can be used to implement a multi-stage zoom. For example, a zoom dropdown menu can be presented to the user with options such as 50%, 75%, default (the scaled size), zoom to fit, or actual size. Once a size is set, the size can persist from image to image. In some implementations, images (e.g., the next book page image of the sequence) can be aggressively preloaded, pre-scaled and potentially pre-rendered at the selected size.

In some implementations, the user is presented with zoom controls upon display of a default page. The zoom controls allow users to zoom-in or zoom-out the book page images. The zoom controls can include zoom "stops" which can be customized using, for example, information about the image that was previously determined during a scanning process (e.g., image dimensions). The zoom "stops" can be zoom percentages (e.g., 10%, 38%) that have been customized to provide better zoom user experience for the particular image being zoomed and the particular viewport size.

Margin Adjusting Process

Figure 3:
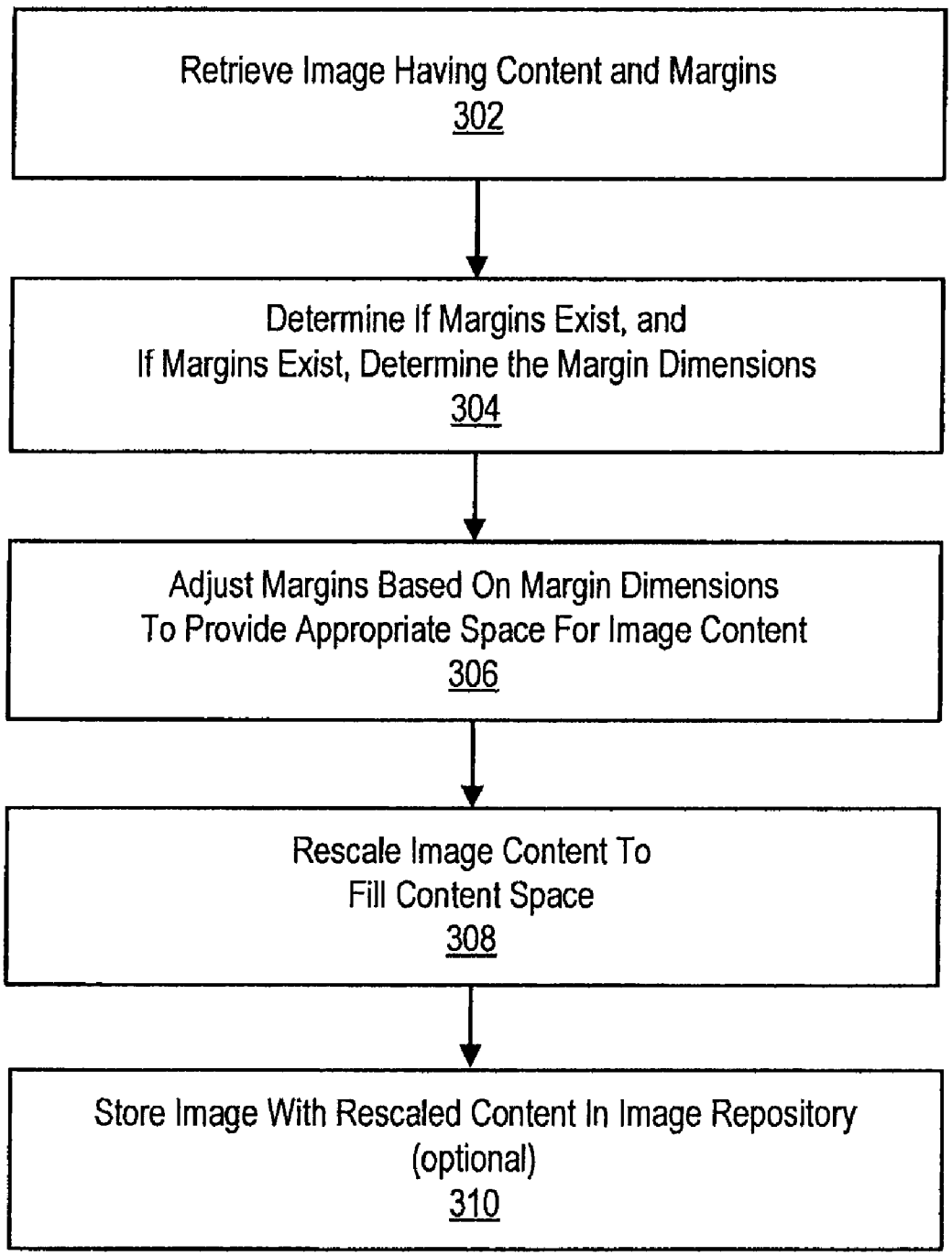
FIG. 3 is a flow diagram for an exemplary margin adjustment process.

FIG. 3 is a flow diagram for an exemplary margin adjusting process 300. Since book page images are digital images of actual book pages, the sometimes ample margins used in a conventional book are captured in the digital image. Such ample margins, however, can diminish the readability of the book in electronic form. The process 300 makes small adjustments to book page margins in the digital domain to maximize readability of book page images.

In some implementations, the process 300 begins by retrieving an image including content and margins from an image repository (302). The process 300 determines whether margins exist, and if margins exist, also determines the dimensions of the margins (304). For example, the process 300 can look for white space in the outer portion of a page image to determine if page margins exist. If page margins exist, then a difference between page dimensions and a text bounding box can be calculated to determine page margin dimensions. Once the margin dimensions are known, standard image cropping or magnifying techniques can be used to adjust (e.g., trim or increase) the margins based on the margin dimensions to provide appropriate (e.g., additional or less) space for the content (306). The image content (e.g., text) can be rescaled to fill the space provided by the margin adjusting (308). In some implementations, the book page images with adjusted margins can be stored in an image repository (e.g., image repository 504) for future retrieval when a user requests a book page having a particular scale (310).

In some implementations, cropping rules are used to provide a uniform presentation of images in the viewport. For example, each book page image in a sequence of book page images can have a designated anchor point, such as the top left-hand corner of the book page image, which can be used to anchor the text in substantially the same location of the image. When the user navigates through a book page image sequence the presentation of the content in the viewport 102 will appear uniform. In some implementations, a template can be used to scale each image in a uniform manner. The template can be a page bounding box with standard dimensions (height, width). The dimensions of the template bounding box can be determined by processing an entire image sequence and determining a typical height and width of the text in the image sequence (e.g., a median height and width). If a given text is close to the template bounding box, than the template is used. Otherwise, the text is processed, as described in reference to FIG. 2.

TOC Creation Process

Figure 4:
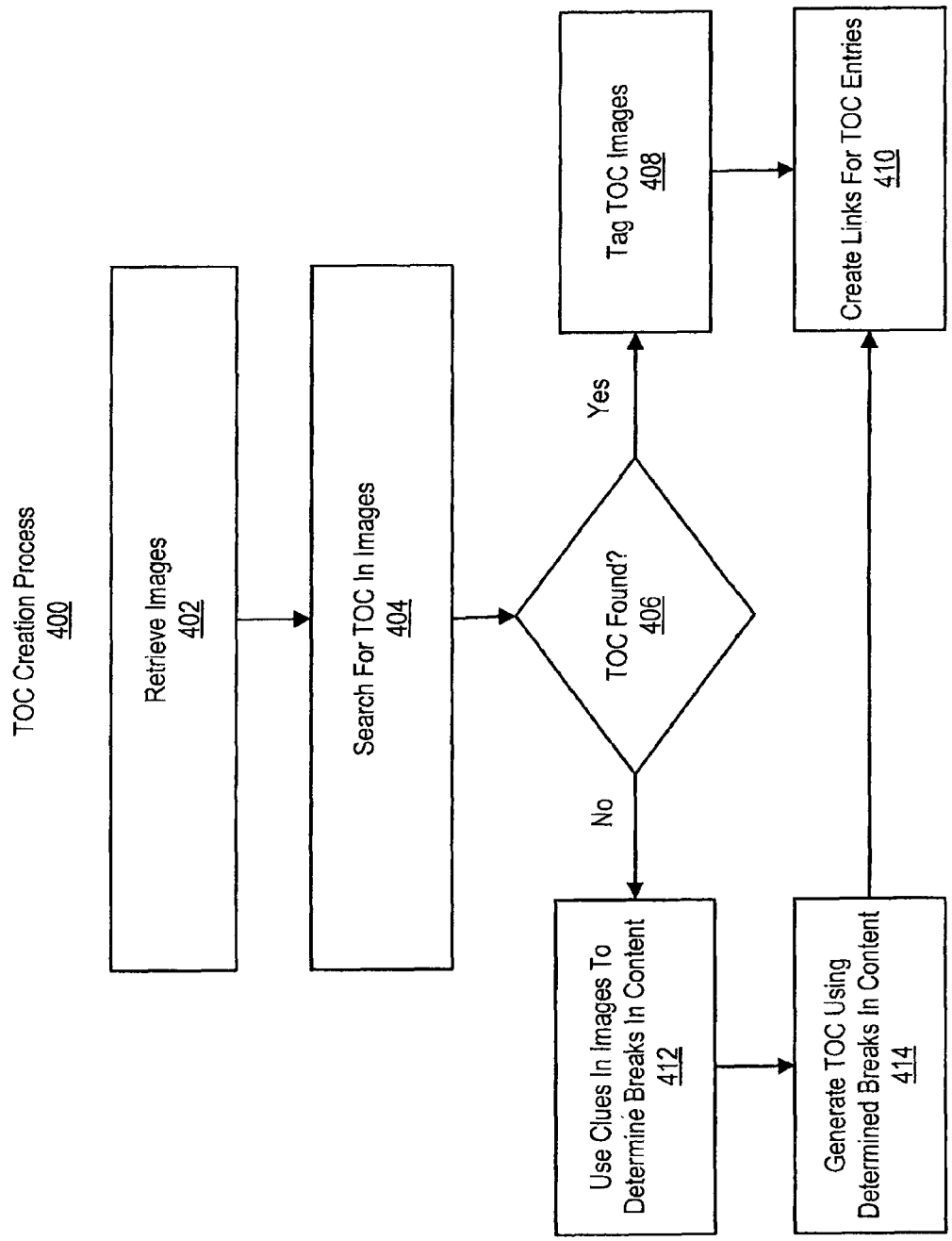
FIG. 4 is a flow diagram for an exemplary table of contents creation process.

FIG. 4 is a flow diagram for an exemplary TOC creation process 400. In some implementations, a TOC is presented in the viewport 102 with hypertext links to other pages in a book page sequence.

The process 400 begins by retrieving a book page sequence for an image repository (402). The book page sequence is searched using, for example, an OCR engine, to identify which images contain a TOC. Various clues, attributes or heuristics can be used to determine whether an image includes a TOC. For example, an image can be determined to be a TOC if the image contains white space, text with large fonts (e.g., a large title), ellipses, roman numerals, italicized text, or any other attributes associated with TOCs. Some or all of these clues, attributes or heuristics can be combined into a score, which can be compared to a reference to determine whether a TOC has been found.

If a TOC is found (406), then the image is tagged (408) and hypertext links are created for one or more (e.g., each) of the TOC entries (410) and embedded in the TOC image. The TOC image, including the links, can then be presented in the viewport 102.

If the TOC is not found (406), the various clues, attributes and heuristics can be used to determine breaks in the book page sequence (412). For example, the first page of each chapter or section in a book can be identified as a break in the book page sequence. The breaks in content can then be used to create a TOC (414). For example, the first page of each chapter or section of a book can be the entries of the TOC. Chapters and/or section title names used in the book can be used for naming entry points in the created TOC, if available. Otherwise, names can be created or the TOC entry points, for example, "Section 1", "Section 2", ..., "Section N".

Once the TOC is determined, links can be created for the TOC entries, and the TOC, including the links, can be presented in the viewport 102, as described in reference to FIG. 6. In some implementations, rather than embedding links into a TOC, the first few sentences or paragraphs of each chapter or section of a book can be displayed in a panel (e.g., a side panel 612 in FIG. 6).

Viewport System Architecture

Figure 5:
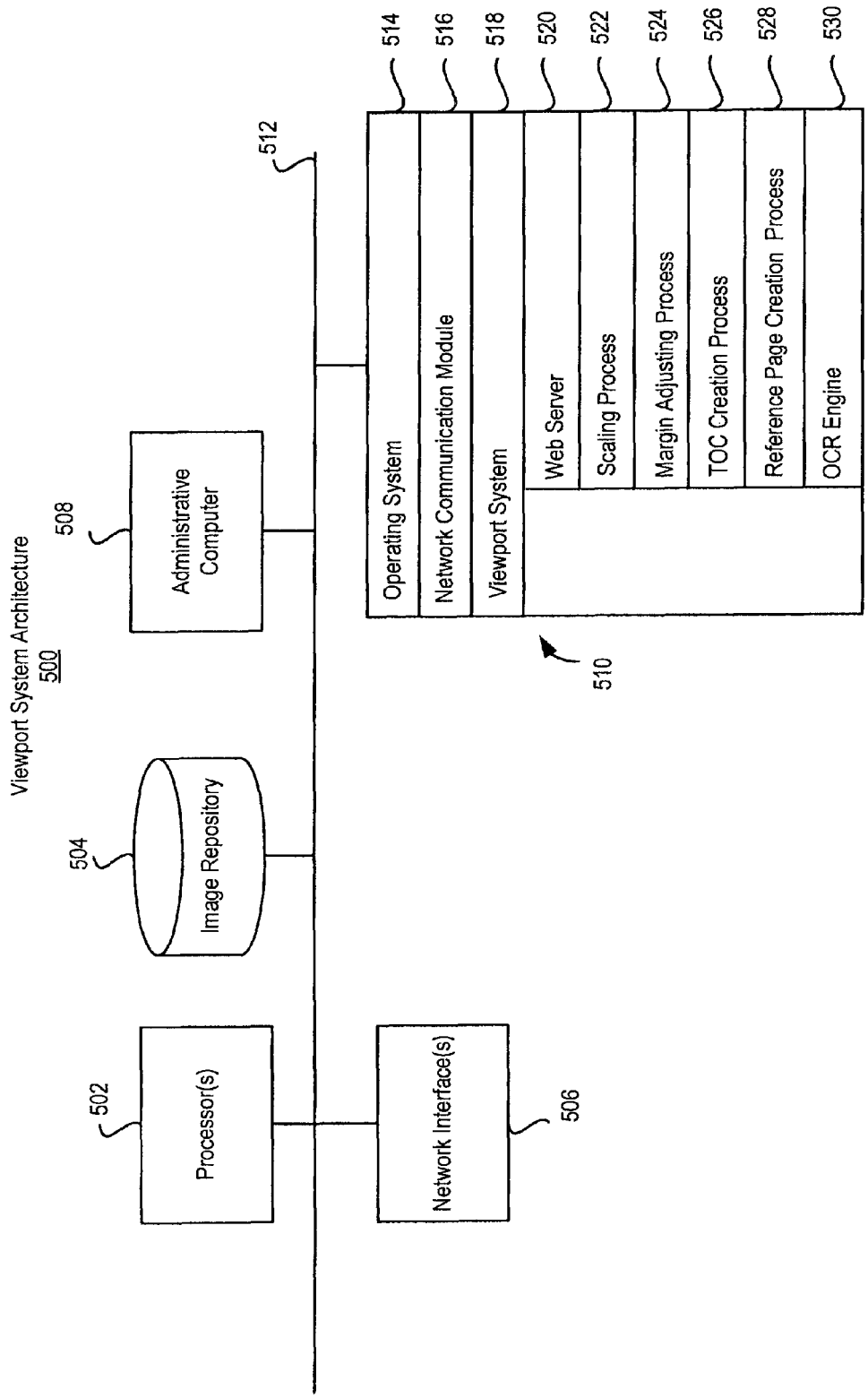
FIG. 5 is a block diagram of an exemplary viewport system architecture.

FIG. 5 is a block diagram of an exemplary viewport system architecture 500. Other architectures are possible, including architectures with more or fewer components. In some implementations, the architecture 500 includes one or more processors 502 (e.g., dual-core Intel® Xeon® Processors), an image repository 504, one or more network interfaces 506, an optional administrative computer 508 and one or more computer-readable mediums 510 (e.g., RAM, ROM, SDRAM, hard disk, optical disk, flash memory, SAN, etc.). These components can exchange communications and data over one or more communication channels 512 (e.g., Ethernet, Enterprise Service Bus, PCI, PCI-Express, etc.), which can include various known network devices (e.g., routers, hubs, gateways, buses) and utilize software (e.g., middleware) for facilitating the transfer of data and control signals between devices.

The term "computer-readable medium" refers to any medium that participates in providing instructions to a processor 502 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 510 further includes an operating system 514 (e.g., Mac OS® server, Windows® NT server), a network communication module 516 and viewport system 518. The operating system 514 can be multi-user, multiprocessing, multitasking, multithreading, real time, etc. The operating system 514 performs basic tasks, including but not limited to: recognizing input from and providing output to the administrator computer 508; keeping track and managing files and directories on computer-readable mediums 510 (e.g., memory or a storage device); controlling peripheral devices (e.g., repositories 504); and managing traffic on the one or more communication channels 512. The network communications module 516 includes various components for establishing and maintaining network connections (e.g., software for implementing communication protocols, such as TCP/IP, HTTP, etc.).

The viewport system 518 includes a web server 520, a scaling process 522, a margin adjusting process 524, a TOC creation process 526, a reference page creation process 528 and an OCR engine 530. These components are described in reference to FIGS. 1-4.

The architecture 500 is one example of a suitable architecture for hosting a viewport system. Other architectures are possible, which can include more or fewer components. For example, the image repository 504 and computer-readable medium 510 can be the same storage device or separate storage devices. The components of architecture 500 can be located in the same facility or distributed among several facilities. The architecture 500 can be implemented in a parallel processing or peer-to-peer infrastructure or on a single device with one or more processors. The viewport system 518 can include multiple software components or it can be a single body of code. Some or all of the functionality of the viewport system 518 can be provided as a service to clients over a network. In such a case, these entities may need to install client applications. Some or all of the functionality of the viewport system 518 can be provided as part of a search engine application.

Exemplary TOC With Hypertext Links

FIG. 6 is a screen shot illustrating an exemplary TOC 604 including links 610. In some implementations, the TOC 604 can be displayed on a book search engine web page 602 displayed in a web browser window 600. Controls 608 can be provided for navigating the pages of the book. In the example shown, the controls 608 include buttons for flipping pages and a search box for jumping the user directly to a desired page. Also, included on the web page 602 is a panel 612 (e.g., the side panel shown) including information and links related to the book, as described in reference to FIG. 1. The TOC 604, including the links 610, can be generated using the process 400 described in reference to FIG. 4.

In the example shown, the user search for the book "Huckleberry Finn" using the book search engine. After clicking on a link associated with Huckleberry Finn, a default book page image is displayed (e.g., a title page). Referring to FIG. 1, if a user clicks on the table of contents link, then an image of the TOC 604 will be displayed, including links 610. If the user clicks or otherwise interacts with a links 610, a book page image in a sequence of book page images responsive to the link will be displayed.

Exemplary Content Reference Page

FIG. 7 is a screen shot illustrating an exemplary content reference page 700. In some implementations, the reference page 700 includes a summary section 701, a content section 702, a review section 704, a pages with images section 706 and a key words section 708. The book reference page 700 shown in FIG. 7 is one example of a content reference page. Other configurations and formats for a content reference page are possible.

Generally, the content reference page is an authoritative source of information related to content. In some implementations, various reference materials are collected or aggregated from various information resources, such as the content itself, the World Wide Web, external metadata or other online resources. The collection can be performed by, for example, a web crawler. Some of the collected information (or link) can be indexed and stored in a repository (e.g., a database) for subsequent retrieval in response to a request for reference materials and/or content (e.g., a search query).

Referring to FIG. 7, the summary section 701 of the book reference page includes a thumbnail image of the book's cover and basic information, such as, for example, title, author, publisher, number of pages, ISBN number, language, physical dimensions, format (i.e., paperback, hardback, e-book), etc.

The contents section 702 includes links to various chapters or sections of the book, and can list keywords that can be found in those chapters or sections. When the user clicks a link, a viewport is presented which allows the user to navigate pages of the chapter or section of the book corresponding to the link using navigation controls (e.g., controls 116).

The review section 704 includes links to book reviews and other information about the book, including reviewer ratings.

The pages with images section 706 displays thumbnails of pages of the book that includes images. If the user clicks on the image, the page with the image corresponding to the clicked thumbnail will be displayed in a viewport. If the viewport is not already presented, the viewport will be invoked in response to the click on the thumbnail image.

The key words section 708 includes categories of keywords contained in the book. The keywords can be links that when clicked cause the book page or pages containing the keyword to be displayed a viewport. If the viewport is not already presented, the viewport will be invoked in response to the click on the keyword link.

Various modifications may be made to the disclosed implementations and still be within the scope of the following claims.

What is claimed is:

1. A computer-implemented method comprising:
   aggregating reference materials associated with a content item, the content item including content and reference material related to the content, where aggregating reference materials includes collecting reference materials from a plurality of sources including from the content item and from one or more external network sources; and
   generating a content reference page including at least some of the aggregated reference materials, where the content reference page includes reference materials from the content item and links to one or more of the external network sources, where the content reference page is configured to provide a particular resource in response to user selection of a corresponding link of the links, and where the content reference page further includes one or more keywords contained in the content in which each keyword is a link configured to provide corresponding portions of the content item in response to user selection.

2. The method of claim 1 where the reference page includes a thumbnail image of a portion of the content that includes an image.

3. The method of claim 1 where the reference page includes a review associated with the content.

4. The method of claim 1 where one or more of the keywords is each associated with a respective keyword category.

5. The method of claim 1, further comprising:
receiving a request for reference material associated with the content item; and
providing the content reference page in response to the request.

6. A computer-readable medium having instructions stored thereon, which, when executed by one or more processors, causes the processors to perform the operations comprising:
aggregating reference materials associated with a content item, the content item including content and reference material related to the content, where aggregating reference materials includes collecting reference materials from a plurality of sources including from the content item and from one or more external network sources; and
generating a content reference page including at least some of the aggregated reference materials, where the content reference page includes reference materials from the content item and links to one or more of the external network sources, where the content reference page is configured to provide a particular resource in response to user selection of a corresponding link of the links, and where the content reference page further includes one or more keywords contained in the content in which each keyword is a link configured to provide corresponding portions of the content item in response to user selection.

7. The computer-readable medium of claim 6 where the reference page includes a thumbnail image of a portion of the content that includes an image.

8. The computer-readable medium of claim 6 where the reference page includes a review associated with the content.

9. The computer-readable medium of claim 6 where one or more of the keywords is each associated with a respective keyword category.

10. The computer-readable medium of claim 6 further comprising instructions which, when executed by the processors, cause the processor to perform operations comprising:
receiving a request for reference material associated with the content item; and
providing the content reference page in response to the request.

11. A system comprising:
a computer-readable medium including instructions;
one or more processors configured to execute the instructions and to perform operations comprising:
aggregating reference materials associated with a content item, the content item including content and reference material related to the content, where aggregating reference materials includes collecting reference materials from a plurality of sources including from the content item and from one or more external network sources; and
generating a content reference page including at least some of the aggregated reference materials, where the content reference page includes reference materials from the content item and links to one or more of the external network sources, where the content reference page is configured to provide a particular resource in response to user selection of a corresponding link of the links, and where the content reference page further includes one or more keywords contained in the content in which each keyword is a link configured to provide corresponding portions of the content item in response to user selection.

12. The system of claim 11 where the reference page includes a thumbnail image of a portion of the content that includes an image.

13. The system of claim 11 where the reference page includes a review associated with the content.

14. The system of claim 11 where one or more of the keywords is each associated with a respective keyword category.

15. The system of claim 11 further comprising instructions which, when executed by the processors, cause the processor to perform operations comprising:
receiving a request for reference material associated with the content item; and
providing the content reference page in response to the request.

* * * * *